United States Patent
Lee (10) Patent No.: US 9,714,689 B2
(45) Date of Patent: Jul. 25, 2017

(54) AIRCRAFT SHOCK ABSORBER REDUNDANT SEAL ASSEMBLY

(71) Applicant: SPP Canada Aircraft, Inc., Mississauga (CA)

(72) Inventor: V-Bond Lee, Mississauga (CA)

(73) Assignee: SPP Canada Aircraft, Inc., Mississauga (CA)

( * ) Notice: Subject to any disclaimer, the term of this patent is extended or adjusted under 35 U.S.C. 154(b) by 37 days.

(21) Appl. No.: 14/687,281

(22) Filed: Apr. 15, 2015

(65) Prior Publication Data

US 2016/0017953 A1     Jan. 21, 2016

(30) Foreign Application Priority Data

Apr. 16, 2014   (CA) .................................... 2849148

(51) Int. Cl.
*F16F 9/36*     (2006.01)
*B64C 25/60*    (2006.01)
*F16F 9/32*     (2006.01)

(52) U.S. Cl.
CPC ............. *F16F 9/365* (2013.01); *B64C 25/60* (2013.01); *F16F 9/3207* (2013.01); *F16F 9/369* (2013.01)

(58) Field of Classification Search
CPC .... F16F 9/36; F16F 9/362; F16F 9/363; F16F 9/364; F16F 9/365; F16F 2230/30; B64C 25/60
See application file for complete search history.

(56) References Cited

U.S. PATENT DOCUMENTS

| 2,524,872 | A | * | 10/1950 | Bauroth | H02K 3/522 310/255 |
| 3,514,114 | A | | 5/1970 | Monahan | |
| 4,136,886 | A | * | 1/1979 | Sjoholm | F16J 15/002 277/361 |

(Continued)

FOREIGN PATENT DOCUMENTS

| DE | 377 431 | 6/1923 |
| DE | 1 807 614 | 6/1969 |

(Continued)

OTHER PUBLICATIONS

Supplemental European Search Report dated Sep. 23, 2015 in correspondence European Application No. 15162730.4.

*Primary Examiner* — Nicholas J Lane
(74) *Attorney, Agent, or Firm* — Faegre Baker Daniels LLP (57) ABSTRACT

A redundant seal assembly for an aircraft shock absorber comprises a changeover unit and dual dynamic seals for sealing a fluid chamber formed between an inner member and an outer member of the shock absorber. The first dynamic seal functions as a primary seal, and the second dynamic seal functions as a backup seal in the initial operation of the shock absorber. A fluid passage is formed from the fluid chamber to the first dynamic seal. The changeover unit has a spool provided in the fluid passage. The spool has a channel that forms pat of the fluid passage. A changeover activator is movable to open and close the fluid passage at the spool to apply or remove the fluid pressure on or from the first dynamic seal so as to change over the functionality as the primary seal between the first dynamic seal and the second dynamic seal.

13 Claims, 6 Drawing Sheets

(56) References Cited

U.S. PATENT DOCUMENTS

| | | | | |
|---|---|---|---|---|
| 5,148,896 | A | * | 9/1992 | Ralph .................... B64C 25/60 |
| | | | | 188/314 |
| 5,310,140 | A | * | 5/1994 | Veaux .................. B64C 25/001 |
| | | | | 244/104 FP |
| 5,593,175 | A | | 1/1997 | Oda et al. |
| 6,283,259 | B1 | * | 9/2001 | Nakadate ................ F16F 9/369 |
| | | | | 188/299.1 |
| 6,676,076 | B1 | | 1/2004 | Davies |
| 2013/0181090 | A1 | | 7/2013 | Martinez Elkington |
| 2014/0090941 | A1 | * | 4/2014 | Shibahara ................ F16F 9/18 |
| | | | | 188/315 |

FOREIGN PATENT DOCUMENTS

| | | |
|---|---|---|
| EP | 0 332 509 | 9/1989 |
| GB | 2 482 414 | 2/2012 |
| GB | 2482414 | 2/2012 |
| JP | 1-250632 | 10/1989 |
| JP | 1-250633 | 10/1989 |
| JP | 2007-186087 | 7/2007 |
| JP | 2010-221766 | 10/2010 |
| WO | 2010/142802 | 12/2010 |

* cited by examiner

FIG. 6B ly for an aircraft shock absorber.

AIRCRAFT SHOCK ABSORBER REDUNDANT SEAL ASSEMBLY

TECHNICAL FIELD

The present disclosure relates to a redundant seal assembly for an aircraft shock absorber.

BACKGROUND

In a landing gear of an aircraft, a shock absorber is provided to absorb and dissipate energy upon impact of the landing. Such a shock absorber typically comprises an outer tube and an inner tube, or a cylinder and a piston. A fluid chamber is formed between the two members to accommodate a fluid that acts as a shock absorber fluid spring. A fluid may be a liquid and/or gas. In order to seal the fluid chamber, the shock absorber is provided with a seal between the two members.

For example, UK patent application publication No. GB2482414 discloses an aircraft shock absorber that comprises an outer tube and an inner tube. This publication discloses use of a primary seal and a spare seal arranged in series between two tubes along the common longitudinal axis, and at least one bypass line that can be closed by means of a switching valve. The bypass line connects the fluid-filled chamber and a space that is located between the seals. When the primary seal leaks, the pressure is removed from the primary seal by closing the switching valve provided in the bypass line, and the spare seal takes over the sealing function. The switching valve used in this shock absorber has a complicated structure including a valve sleeve, a valve slide, an anti-turn device and an actuating pin.

It is therefore desirable to provide a reliable seal assembly for an aircraft shock absorber with a simpler structure.

SUMMARY

The following presents a simplified summary of some aspects or embodiments of the disclosure in order to provide a basic understanding of the invention. This summary is not an extensive overview of the invention. It is not intended to identify key or critical elements of the invention or to delineate the scope of the invention. Its sole purpose is to present some embodiments of the disclosure in a simplified form as a prelude to the more detailed description that is presented later.

In exemplifications thereof, the present disclosure provides an improved seal assembly for an aircraft shock absorber that obviates or mitigates at least one of the disadvantages of existing mechanisms.

Exemplifications of the invention use a redundant seal assembly having dual seals, one functioning as a primary seal and the other functioning as a backup seal, and a changeover unit having a spool that can change over the functionalities of the dual seals.

In accordance with an exemplification of the present disclosure, there is provided a redundant seal assembly for an aircraft shock absorber having an inner member and an outer member that slidably receives the inner member to form a fluid chamber therebetween. The redundant seal assembly comprises first and second dynamic seals provided between the inner member and the outer member, and a changeover unit. The first dynamic seal functions as a primary seal to seal the fluid chamber in an initial operation of the shock absorber. The second dynamic seal functions as a backup seal while the first dynamic seal functions as the primary seal. The changeover unit comprises a changeover housing that has a fluid passage which is connected to the fluid chamber and extends a fluid pressure from the fluid chamber to the first dynamic seal, a spool provided in the fluid passage, the spool having a channel that forms part of the fluid passage, and a changeover activator that is movable in the changeover housing to open or close the fluid passage at the spool to apply or remove the fluid pressure on or from the first dynamic seal so as to change over the functionality as the primary seal between the first dynamic seal and the second dynamic seal.

In accordance with another exemplification of the present disclosure, there is provided an aircraft shock absorber comprising an inner member, an outer member receiving the inner member to form a fluid chamber therebetween, a bearing provided between an inner surface of the outer member and an outer surface of the inner member to allow slidable movement of the inner member along the inner surface of the outer member, first and second dynamic seals provided between the inner member and the bearing, and a changeover unit. The first dynamic seal functions as a primary seal to seal the fluid chamber in an initial operation of the shock absorber. The second dynamic seal functions as a backup seal while the first dynamic seal functions as the primary seal. The changeover unit comprises a changeover housing that has a fluid passage which is connected to the fluid chamber and extends a fluid pressure from the fluid chamber to the first dynamic seal, a spool provided in the fluid passage, the spool having a channel that forms part of the fluid passage, and a changeover activator that is movable in the changeover housing to open or close the fluid passage at the spool to apply or remove the fluid pressure on or from the first dynamic seal so as to change over the functionality as the primary seal between the first dynamic seal and the second dynamic seal.

This summary does not necessarily describe all features of the invention.

BRIEF DESCRIPTION OF THE DRAWINGS

These and other features of the invention will become more apparent from the following description in which reference is made to the appended drawings wherein.

DETAILED DESCRIPTION OF EXEMPLARY EMBODIMENTS

A redundant seal assembly according to an embodiment of the present invention is provided for an aircraft shock absorber. The aircraft shock absorber has an inner member and an outer member slidably receiving the inner member therein. A fluid chamber is provided between the inner member and the outer member for accommodating a fluid. The fluid may be a liquid and/or gas, such as a hydraulic oil and nitrogen. The inner and outer members may be both tubes to form a piston and a cylinder.

The redundant seal assembly has a dual sealing arrangement for sealing the fluid chamber between the first and second members and preventing leakage of the fluid into the atmosphere. The dual sealing arrangement includes two dynamic seals: a first dynamic seal functioning as a primary seal in the initial operation of the shock absorber, and a second dynamic seal functioning as a backup seal. A dynamic seal is a seal that seals a sliding surface. The primary seal and backup seal are capable of providing a seal during the shock absorber extension and compression.

The redundant seal assembly also has a spool. The spool has a channel therein. The channel forms part of a fluid passage formed from the fluid chamber to the first dynamic seal. The fluid passage can be opened or closed at the spool by a changeover activator so that the fluid pressure from the fluid chamber is applied on or removed from the first dynamic seal.

In the initial operation of the shock absorber, the fluid passage is open and the fluid pressure from the fluid chamber is applied on the primary seal, i.e., the first dynamic seal. When the first dynamic seal leaks, the fluid passage is closed at the spool to remove the fluid pressure from the first dynamic seal, and the second dynamic seal, then becomes the primary seal. Thus, the functionality as the primary seal can be changed over between the first dynamic seal and the second dynamic seal. This changeover can be performed without having to disassemble the shock absorber thereby reducing maintenance, repair and cost.

Figure 1:
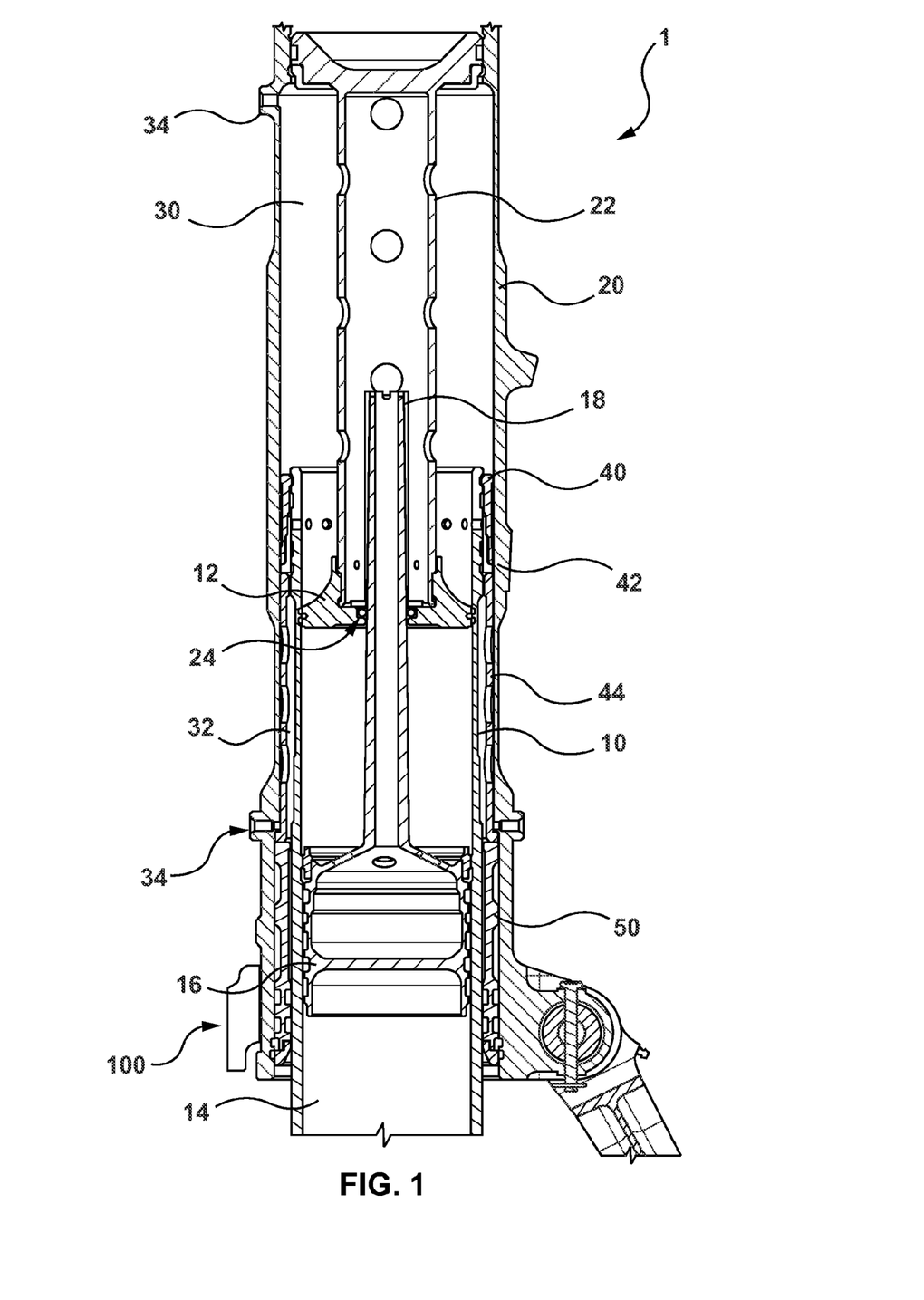
FIG. 1 is a diagram showing a section of an aircraft shock absorber having a redundant seal assembly in accordance with an embodiment of the present invention.

The following embodiments are described using an example of a single stage separated nitrogen aircraft shock absorber shown in FIG. 1. In a different embodiment, the redundant seal assembly may be provided in an aircraft shock absorber of a different configuration, such as a single stage mixed nitrogen shock absorber and a two stage shock absorber.

FIG. 1 shows a partial cross-sectional view of aircraft shock absorber 1 having a piston 10 and a cylinder 20. An oil/nitrogen chamber 30 is formed between piston 10 and cylinder 20. Between the outer surface of piston 10 and the inner surface of cylinder 20, an upper bearing 40 and a lower bearing 50 are provided for facilitating smooth slidable movement of piston 10 in cylinder 20 along its axial direction. A grand nut 60 (FIG. 2) is provided at the lower end of cylinder 20.

Piston 10 has a piston head 12 located within cylinder 20. Piston 10 has a nitrogen chamber 14 separated by a separator 16 from a metering pin 18 which protrudes through piston head 12. Within cylinder 20, an orifice support tube 22 is provided with an orifice plate 24 at the lower end of orifice support tube 22.

Oil/nitrogen chamber 30 is formed above piston head 12. The lower end of oil/nitrogen chamber 30 extends between the outer surface of piston 10 and the inner surface of cylinder 20, where it forms a rebound oil chamber 32 between upper bearing 40 and lower bearing 50. Hydraulic ports 34 are provided for oil chamber/nitrogen 30 and rebound chamber 32.

A redundant seal assembly 100 according to an embodiment of the present invention is provided in lower bearing 50 of shock absorber 1 as a main piston seal arrangement.

Figure 2:
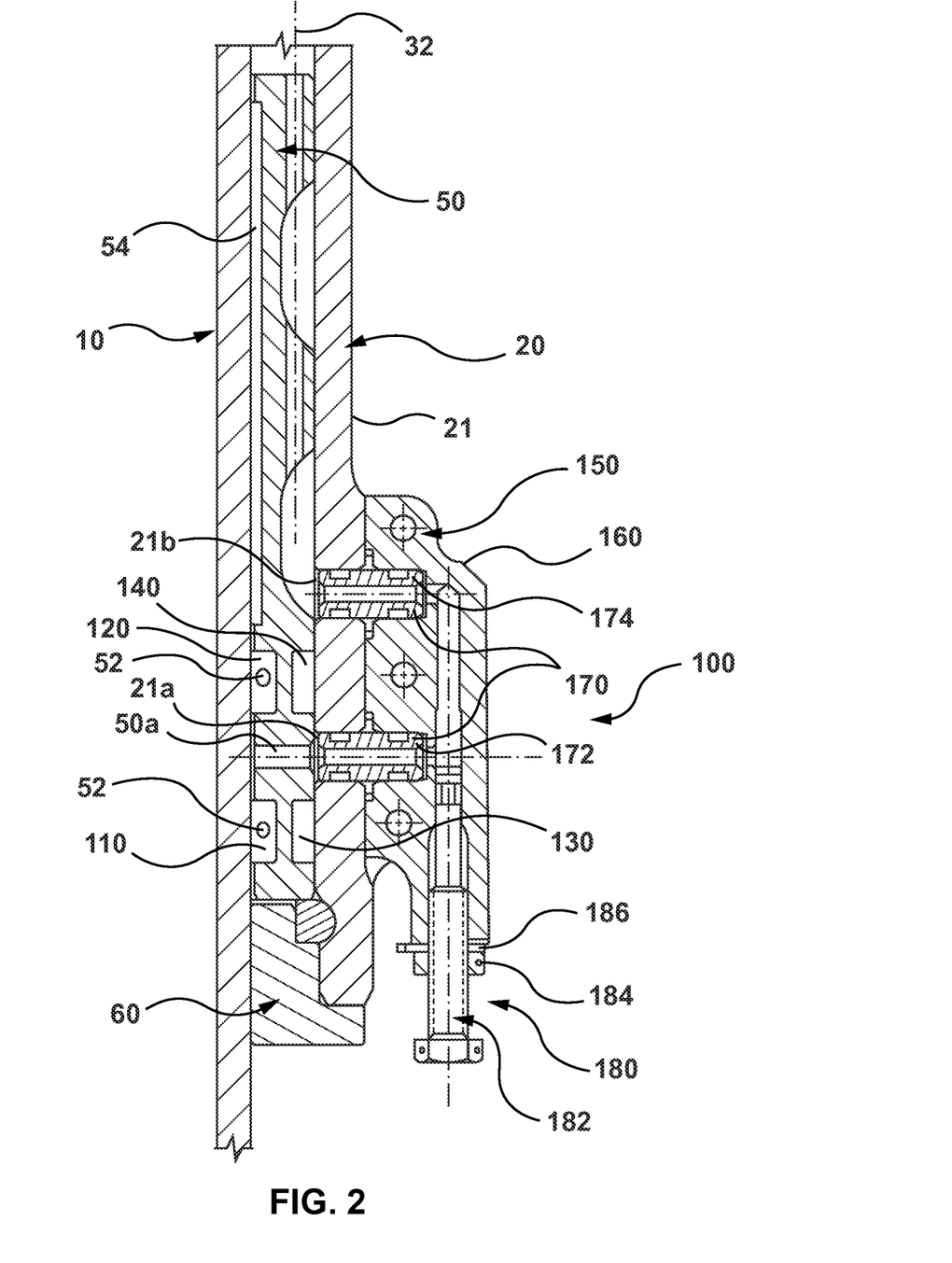
FIG. 2 is a diagram showing details of the redundant seal assembly.

FIG. 2 shows details of redundant seal assembly 100. Redundant seal assembly 100 has dual dynamic seals to seal oil chamber 32 between piston 10 and bearing 50 while allowing the slidable movement of piston 10 along bearing 50. The dynamic seals prevent oil from leaking from the rebound chamber. The dual seals comprise a lower dynamic seal 110 and an upper dynamic seal 120. Lower dynamic seal 110 functions as a primary seal in the initial operation of the shock absorber, and upper dynamic seal 120 functions as a backup seal, as further described below. Each of lower and upper dynamic seals 110, 120 may be formed with a single sealing member or a combination of multiple sealing members.

In this embodiment, bearing 50 has grooves 52 formed on its inner surface. Lower dynamic seal 110 is provided in the lower groove of the bearing, and upper dynamic seal 120 is provided in the upper groove of the bearing.

Figure 3:
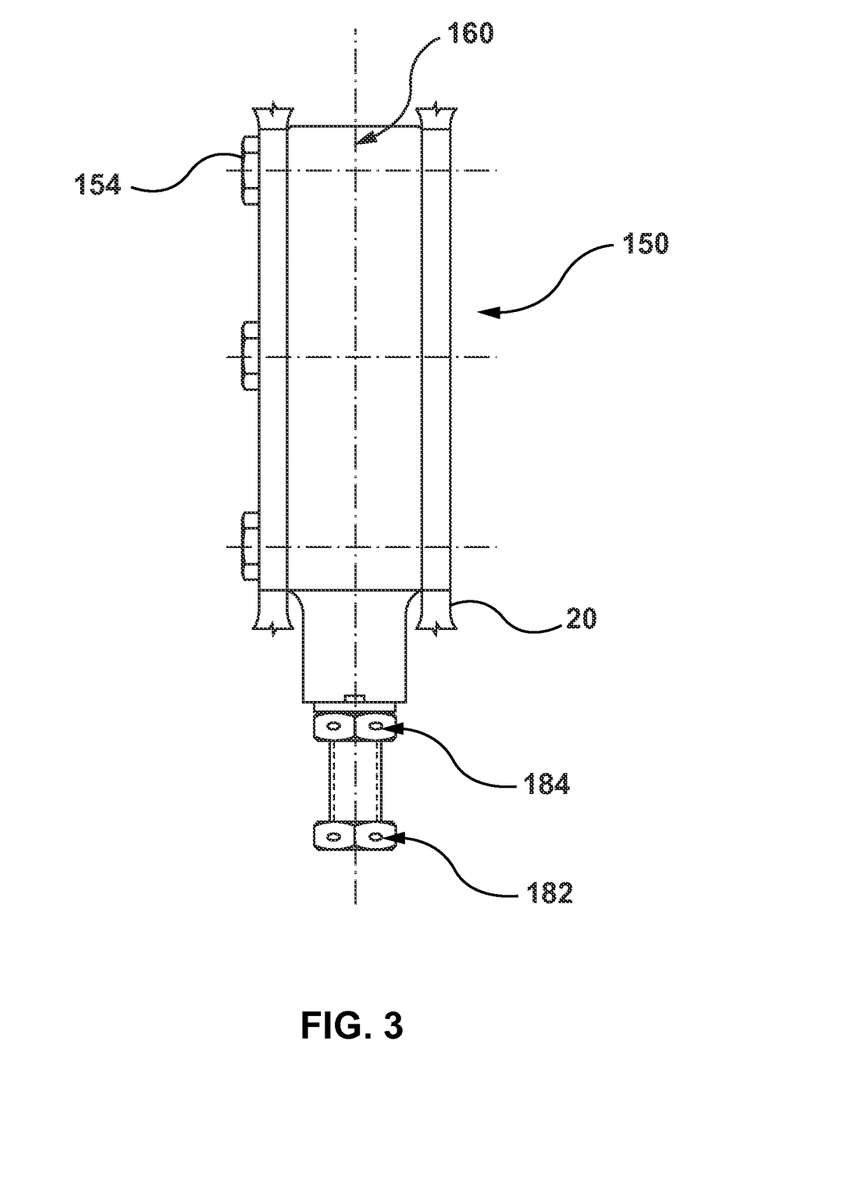
FIG. 3 is a diagram showing an outer view of the redundant seal assembly.

Redundant seal assembly 100 also has a changeover unit 150 provided near the lower end of cylinder 20. Changeover unit 150 is retained against cylinder 20. FIG. 3 shows an external view of changeover unit 150. Changeover unit 150 is fastened to cylinder 20 by means of a pinned connection using fastening bolts 154.

Referring back to FIG. 2, changeover unit 150 has a changeover housing 160, a spool 170 and a changeover activator 180. Changeover housing 160 has a fluid passage that is connected to oil chamber 32 and extends to lower dynamic seal 110. Spool 170 is provided in the fluid passage. Spool 170 has a channel therein, which forms part of the fluid passage. Changeover activator 180 is movable in changeover housing 160 to close or open the fluid passage at spool 170. Changeover activator 180 may be a pin or a plunger bolt that can be advanced/retracted or or rotated in changeover housing 160. By closing or opening the fluid passage, changeover unit 150 allows the fluid pressure from fluid chamber 32 to be removed from or applied on lower dynamic seal 110, as further described below.

In this embodiment, spool 170 has a lower spool 172 and an upper spool 174. Lower and upper spools 172 and 174 have channels which act as part of the fluid passage, and provide sealing between the housing 160 and cylinder 20.

Cylinder wall 21 has a lower hole 21a and an upper hole 21b therethrough in a section near the lower end where changeover unit 150 is provided. Lower hole 21a is located at a level between lower dynamic seal 110 and upper dynamic seal 120. Upper hole 21b is located at a level higher than upper dynamic seal 120. Also, bearing 50 has a hole 50a therethrough at a level between lower dynamic seal 110 and upper dynamic seal 120, corresponding to lower hole 21a of cylinder wall 21.

The fluid passage extends from oil chamber 32, along the outer surface of bearing 50, through upper hole 21b of cylinder wall 21, upper spool 174, changeover housing 160, lower spool 172, lower hole 21a of cylinder wall 21, hole 50a of bearing 50, along the inner surface of bearing 50, and then to the upper side of lower dynamic seal 110 forming a pressurized chamber. This configuration provides the pressure applied to the upper side of lower dynamic seal 110 and creates the pressure differential between the upper and lower sides of lower dynamic seal 110.

The upper end of the pressurized chamber formed at the upper side of lower dynamic seal 110 also reaches the lower side of upper dynamic seal 120. In addition, another fluid passage extends from oil chamber 32 to the upper side of upper dynamic seal 120 along the inner surface of bearing 50. Thus, when the fluid passage to lower dynamic seal 110 is open, upper dynamic seal 120 is at pressure balance by receiving the fluid pressure on both the upper side and the lower side, and acts as a backup seal.

In this configuration, the inner surface of bearing 50 above upper dynamic seal 120 is lubricated by the hydraulic oil both when the fluid passage to lower dynamic seal 110 is open and when it is closed, i.e., both during lower dynamic seal 110 acts as the primary seal and after the primary seal functionality is switched over to upper dynamic seal 120.

In order to provide better segregation of a fluid passage along the outer surface of bearing 50, it is desirable that changeover unit 150 also has a lower static seal 130 and an upper static seal 140, both provided between the outer surface of bearing 50 and the inner surface of cylinder 20. Lower static seal 130 is provided near the lower end of bearing 50 to prevent leakage of the oil to the external of the shock absorber and to the atmosphere. Upper static seal 140 is provided at a level between lower hole 21a and upper hole 21b of cylinder wall 21. Lower static seal 130 and upper static seal 140 may be provided in grooves formed on the outer surface of bearing 50. In other embodiment, the location of the static and dynamic seal grooves may vary in position.

When a bearing liner 54 is provided on the inner surface of bearing 50, it is preferable that dynamic seals 110 and 120 are located on the external side of bearing liner 54, i.e., below the lower end of bearing liner 54. By this arrangement, it is possible to ensure that bearing liner 54 remains lubricated by the hydraulic oil both before and after backup upper dynamic seal 120 is activated.

As shown in FIG. 2, lower spool 172 and upper spool 174 may be partially inserted in lower hole 21a and upper hole 21b of cylinder wall 21, respectively. Spools 172, 174 may be inserted into holes 21a, 21b by means of a socket or threads. In a different embodiment, lower and upper spools 172 and 174 may be located entirely within changeover housing 160 as a one piece of design.

Spools 172, 174 form radial seals against the cylinder 20. The fluid pressure is activated or deactivated on lower dynamic seal 110 by a changeover pin 182 which is a plunger bolt threaded into changeover housing 160 with a jam nut 184 via washer 186. Changeover pin 182 has a seal against the housing 160 to ensure no leakage of the fluid both when it is inserted into the housing 160 and when it is retracted from the housing 160.

The operation of the redundant seal assembly 100 is now described.

In the initial operation of the shock absorber, the fluid passage to lower dynamic seal 110 is open. Thus, the oil can flow through the fluid passage, and the fluid pressure from oil chamber 32 is applied on the upper side of lower dynamic seal 100. Thus, lower dynamic seal 110 is functioning as the primary seal. Upper dynamic seal 120 acts as a backup seal and is at pressure balance by receiving the fluid pressure on both the upper side and the lower side.

Upon detection of leakage from lower dynamic seal 110, changeover pin 182 is threaded further into changeover housing 160, which creates discontinuity in the fluid passage at spool valve 70 so as to shut off and close the fluid passage. When the fluid passage to lower dynamic seal 110 is closed, the fluid pressure from oil chamber 32 is removed from lower dynamic seal 110. When the pressure is removed from lower dynamic seal 110, upper dynamic seal 120 becomes the primary seal. Thus, the changeover can be performed without requiring to disassemble the shock absorber. The lower dynamic seal becomes un-lubricated.

The seal provided on changeover pin 182 prevents leakage of the fluid between changeover pin 182 and the housing 160 in both modes of operation of the redundant seal assembly.

When bearing liner 54 is provided and positioned on the internal side of dynamic seals 110 and 120, bearing liner 54 remains lubricated by the hydraulic oil even after the backup seal, i.e., upper dynamic seal 120, is activated.

As described above, it is possible to accomplish the changeover between the primary seal and the backup seal with a simple and reliable mechanism. It does not require a complicated charge valve. Since two holes through the cylinder and a hole through the bearing allow the formation of the fluid passage to the lower dynamic seal, the redundant seal assembly can be implemented without dramatically changing typical shock absorber designs.

In the embodiment shown in FIG. 2, changeover housing 160 and changeover pin 182 are provided in a manner that the plunger bolt faces downward so that it advances upward to close the fluid passage at spool 170 to deactivate the fluid pressure on lower dynamic seal 110.

Figure 4:
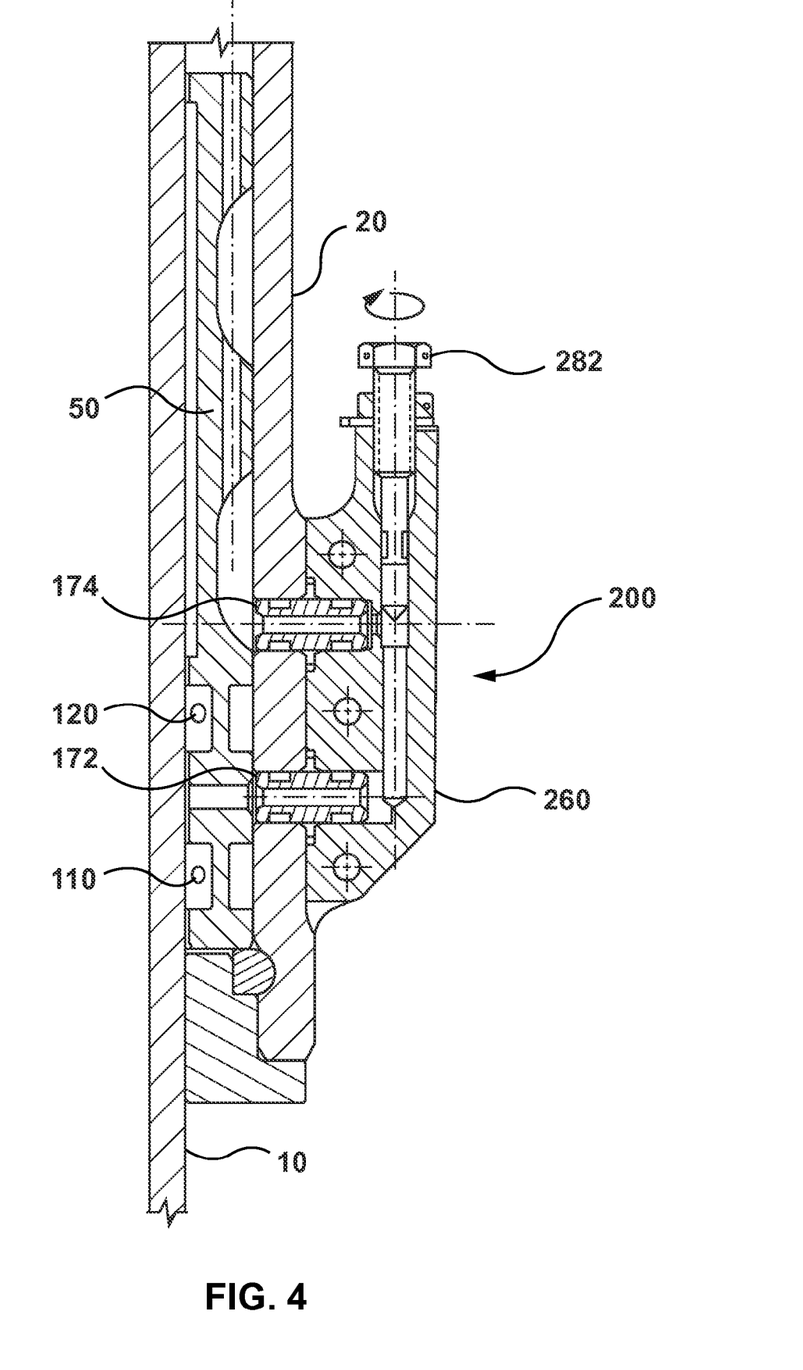
FIG. 4 is a diagram showing a redundant seal assembly in accordance with another embodiment of the present invention.

FIG. 4 shows another embodiment of a redundant seal assembly 200. Similar elements described above are denoted with same reference numbers. In this embodiment, changeover housing 260 and changeover pin or plunger bolt 282 are provided in a manner that plunger bolt 282 faces upward so that it advances downward to close the fluid passage at spools 172, 174 to deactivate the fluid pressure on lower dynamic seal 110. Changeover pin 282 has a seal against changeover housing 260 to prevent leakage of the fluid both when it is inserted into the housing 260 and when it is retracted from the housing 260. This arrangement may make the changeover to be performed easier due to accessibility.

Figure 5A:
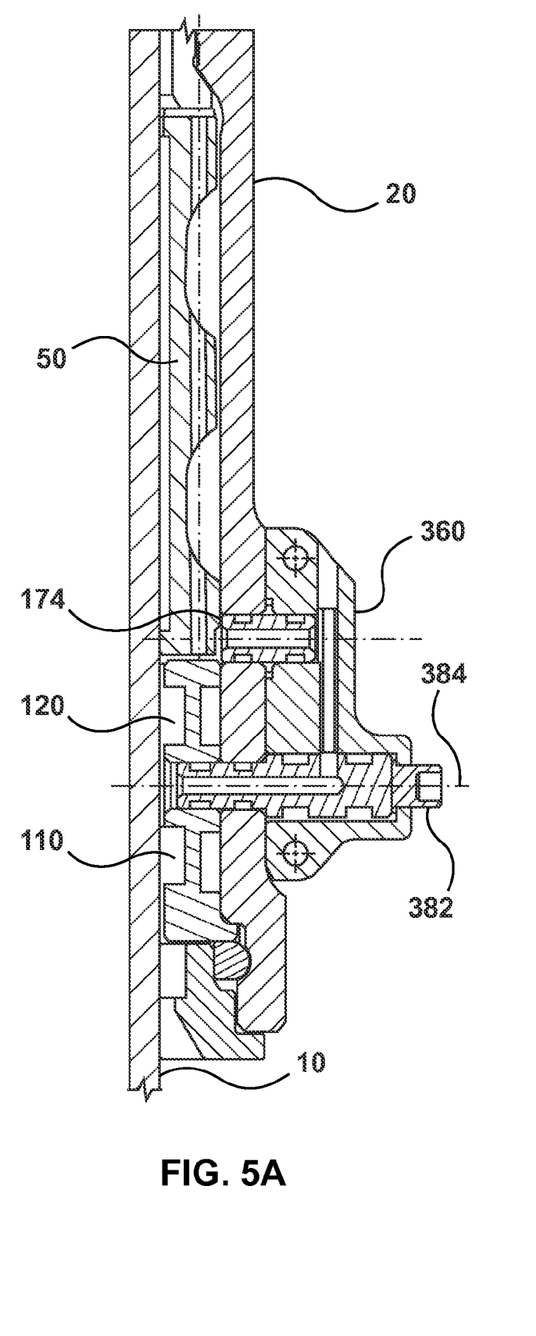
FIG. 5(A) is a diagram showing a redundant seal assembly in accordance with another embodiment of the present invention.
Figure 5B:
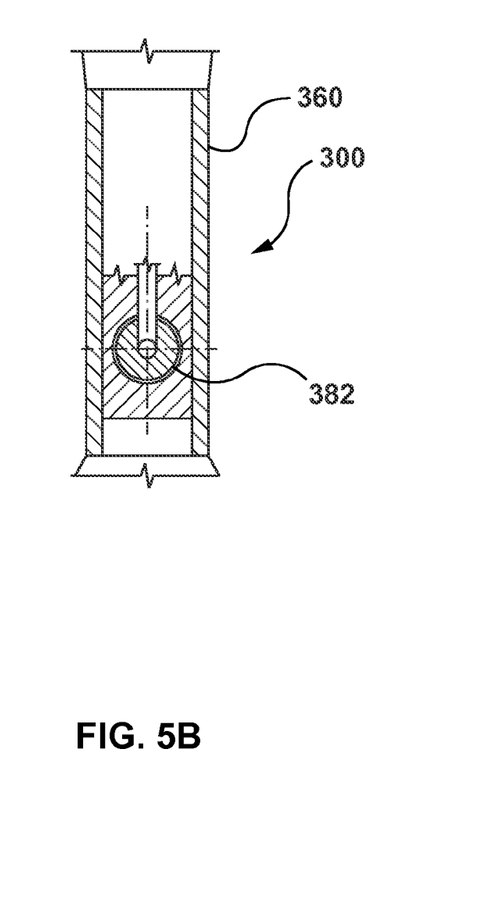
FIG. 5(B) is another diagram showing the redundant seal assembly of the embodiment of FIG. 5(A)

FIGS. 5(A) and (B) show another embodiment of a redundant seal assembly 300. Similar elements described above are denoted by same reference numbers. In this embodiment, redundant seal assembly 300 has a single spool 174. Changeover housing 360 and changeover pin or plunger bolt 382 are provided in a manner that plunger bolt 382 faces a sideway so that changeover pin 382 acts as a rotary valve. Changeover pin 382 is rotated about an axis 384 to close the fluid passage at spool 174 to deactivate the fluid pressure on the lower dynamic seal 110, as shown in FIG. 5(8). Rotary valve 382 has a seal against changeover housing 360 to prevent leakage of the fluid both when it is at a position to open the fluid passage and when it is rotated to close the fluid passage.

Figure 6A:
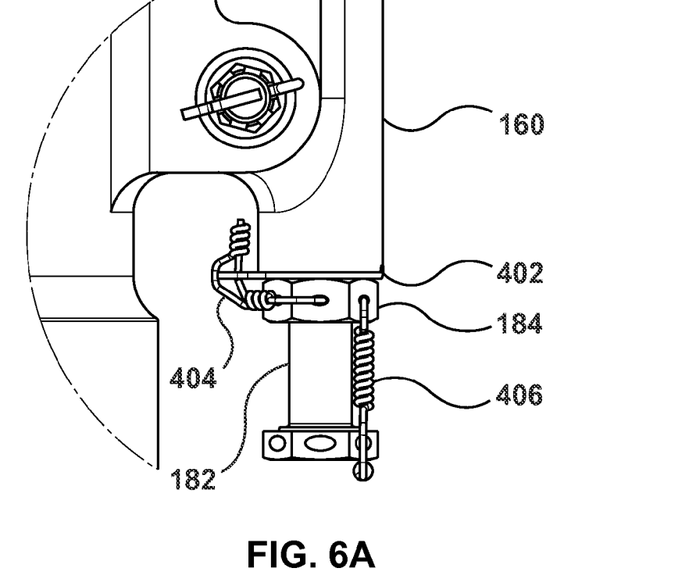
FIG. 6(A) is a diagram showing an example of a retention method of a changeover pin.
Figure 6B:
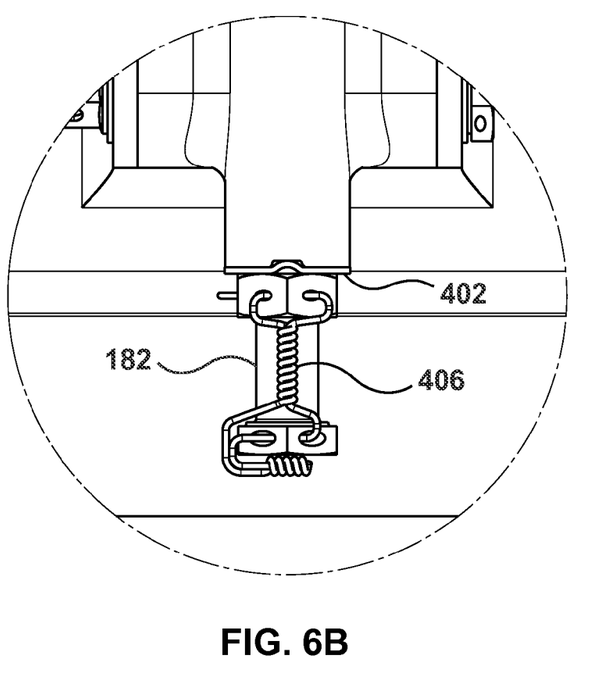
FIG. 6(B) is another diagram showing an example of a retention method of a changeover pin.

It is preferable that the rotary valve or changeover pin is secured to prevent inadvertent rotation or movement. This may be accomplished by common retention methods, such as lock wire. For example, as shown in FIGS. 6(A) and 6(8), changeover pin 182 shown in FIG. 2 may be secured by way of lock wire 404 for securing jam nut 184 on tab washer 402, and lock wire 406 for securing the head of changeover pin 182 on secured jam nut 184.

While particular embodiments of the present invention have been shown and described, changes and modifications may be made to such embodiments without departing from the scope of the invention. For example, in the above embodiments, the lower dynamic seal functions as a primary seal and the upper dynamic seal functions as a backup seal. In a different embodiment, the functionalities of the dual seals may be reversed. Also, in the above embodiments, the spool and the changeover activator are arranged so that the advancement of the changeover pin into the housing closes the fluid passage. In a different embodiment, these elements may be arranged so that the advancement of the changeover pin into the housing opens the fluid passage to the primary seal.

It is to be understood that the singular forms "a", "an" and "the" include plural referents unless the context clearly dictates otherwise. Thus, for example, reference to "a device" includes reference to one or more of such devices, i.e. that there is at least one device. The terms "comprising," "having," "including," and "containing" are to be construed as open-ended terms (i.e., meaning "including, but not limited to,") unless otherwise noted. All methods described herein can be performed in any suitable order unless otherwise indicated herein or otherwise clearly contradicted by context. The use of examples or exemplary language (e.g., "such as") is intended merely to better illustrate or describe embodiments of the invention and is not intended to limit the scope of the invention unless otherwise claimed.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

The invention claimed is:

1. A redundant seal assembly for an aircraft shock absorber having an inner member and an outer member that slidably receives the inner member to form a fluid chamber therebetween, the redundant seal assembly comprising:
    a first dynamic seal provided between the inner member and the outer member, the first dynamic seal functioning as a primary seal to seal the fluid chamber in an initial operation of the shock absorber;
    a second dynamic seal provided between the inner member and the outer member, the second dynamic seal functioning as a backup seal while the first dynamic seal functions as the primary seal; and
    a changeover unit comprising:
        a changeover housing that has a fluid passage which is connected to the fluid chamber and extends a fluid pressure from the fluid chamber to the first dynamic seal;
        a first spool provided in the fluid passage, the first spool having a channel that forms part of the fluid passage;
        a second spool located in the fluid passage; and
        a changeover activator that is movable in the changeover housing to open or close the fluid passage at the first spool to apply or remove the fluid pressure on or from the first dynamic seal so as to change over the functionality as the primary seal between the first dynamic seal and the second dynamic seal;
    wherein the shock absorber further has a bearing provided on an inner surface of the outer member to allow slidable movement of the inner member along the inner surface of the outer member, and the first dynamic seal and the second dynamic seal are provided on an inner surface of the bearing facing an outer surface of the inner member;
    wherein the first dynamic seal is provided in a first groove formed on the inner surface of the bearing, and the second dynamic seal is provided in a second groove formed on the inner surface of the bearing, wherein the first groove is located farther from the fluid chamber than the second groove; and
    wherein the changeover unit is provided on a wall of the outer member where two holes are formed through the wall, and the fluid passage is formed to extend from the fluid chamber, along an outer surface of the bearing, through one of the holes of the wall of the outer member, through the second spool, through the changeover housing, through the first spool, through the other one of the holes of the wall of the outer member, through a hole formed in the bearing, along the inner surface of the bearing, and to the first dynamic seal.

2. The redundant seal assembly as claimed in claim 1, wherein at least a portion of the first spool or the second spool is inserted in at least one of the holes formed in the outer member.

3. The redundant seal assembly as claimed in claim 2 wherein the changeover unit further comprises:
    a first static seal provided between the outer surface of the bearing and the inner surface of the outer member to prevent leakage of the fluid to the external of the shock absorber; and
    a second static seal provided between the outer surface of the bearing and the inner surface of the outer member at a location between the two holes of the outer member where the fluid passage passes through so as to provide segregation of the fluid passage along the outer surface of the bearing.

4. The redundant seal assembly as claimed in claim 3, wherein the first static seal is provided in a third groove formed on the outer surface of the bearing, and the second static seal is provided in a fourth groove formed on the outer surface of the bearing, wherein the third groove is located farther from the fluid chamber than the fourth groove.

5. The redundant seal assembly as claimed in claim 1, wherein the fluid from the fluid chamber is allowed to flow along the inner surface of the bearing to the second dynamic seal so as to facilitate lubrication of the inner surface of the bearing.

6. The redundant seal assembly as claimed in claim 1, wherein
    the bearing has a liner on its inner surface, and
    the first dynamic seal and the second dynamic seal are located father from the fluid chamber than the bearing liner so as to facilitate lubrication of the bearing liner.

7. The redundant seal assembly as claimed in claim 1, wherein the changeover activator is a changeover pin that is movable in the changeover housing to activate/deactivate the fluid pressure to the first and second dynamic seals.

8. The redundant seal assembly as claimed in claim 7, wherein the changeover pin is provided to advance upward in order to close the fluid passage at the first spool so that the fluid pressure from the fluid chamber is removed from the first dynamic seal.

9. The redundant seal assembly as claimed in claim 7, wherein the changeover pin is provided to advance downward to in order to close the fluid passage at the first spool so that the fluid pressure from the fluid chamber is removed from the first dynamic seal.

10. The redundant seal assembly as claimed in claim 7, wherein the changeover pin is provided as a rotary valve to rotate in order to close the fluid passage at the first spool so that the fluid pressure from the fluid chamber is removed from the first dynamic seal.

11. The redundant seal assembly as claimed in claim 1, wherein the changeover activator has a seal thereon against the changeover housing.

12. The redundant seal assembly as claimed in claim 1, wherein the changeover unit further comprises a lock wire for securing the changeover activator to prevent inadvertent movement of the changeover activator.

13. An aircraft shock absorber comprising:
   an inner member;
   an outer member receiving the inner member to form a fluid chamber therebetween;
   a bearing provided between an inner surface of the outer member and an outer surface of the inner member to allow slidable movement of the inner member along the inner surface of the outer member;
   a first dynamic seal provided between the inner member and the bearing, the first dynamic seal functioning as a primary seal to seal the fluid chamber in an initial operation of the shock absorber;
   a second dynamic seal provided between the inner member and the bearing, the second dynamic seal functioning as a backup seal while the first dynamic seal functions as the primary seal; and
   a changeover unit comprising:
      a changeover housing that has a fluid passage which is connected to the fluid chamber and extends a fluid pressure from the fluid chamber to the first dynamic seal;
      a spool provided in the fluid passage, the first spool having a channel that forms part of the fluid passage;
      a second spool located in the fluid passage; and
      a changeover activator that is movable in the changeover housing to open or close the fluid passage at the first spool to apply or remove the fluid pressure on or from the first dynamic seal so as to change over the functionality as the primary seal between the first dynamic seal and the second dynamic seal,
   wherein the shock absorber further has a bearing provided on an inner surface of the outer member to allow slidable movement of the inner member along the inner surface of the outer member, and the first dynamic seal and the second dynamic seal are provided on an inner surface of the bearing facing an outer surface of the inner member;
   wherein the first dynamic seal is provided in a first groove formed on the inner surface of the bearing, and the second dynamic seal is provided in a second groove formed on the inner surface of the bearing, wherein the first groove is located farther from the fluid chamber than the second groove; and
   wherein the changeover unit is provided on a wall of the outer member where two holes are formed through the wall, and the fluid passage is formed to extend from the fluid chamber, along an outer surface of the bearing, through one of the holes of the wall of the outer member, through the second spool, through the changeover housing, through the first spool, through the other one of the holes of the wall of the outer member, through a hole formed in the bearing, along the inner surface of the bearing, and to the first dynamic seal.

* * * * *

UNITED STATES PATENT AND TRADEMARK OFFICE
CERTIFICATE OF CORRECTION

PATENT NO. : 9,714,689 B2  
APPLICATION NO. : 14/687281  
DATED : July 25, 2017  
INVENTOR(S) : V-Bond Lee Page 1 of 1

It is certified that error appears in the above-identified patent and that said Letters Patent is hereby corrected as shown below:

On the Title Page

Item [57], Line 10, delete "pat" and insert --part--

In the Specification

In Column 6, Line 52, delete "6(8)" and insert --6(B)--

Signed and Sealed this  
Seventeenth Day of April, 2018

Andrei Iancu  
*Director of the United States Patent and Trademark Office*